July 20, 1948.  E. F. ROSSMAN  2,445,407
SHOCK ABSORBER
Filed Oct. 1, 1946
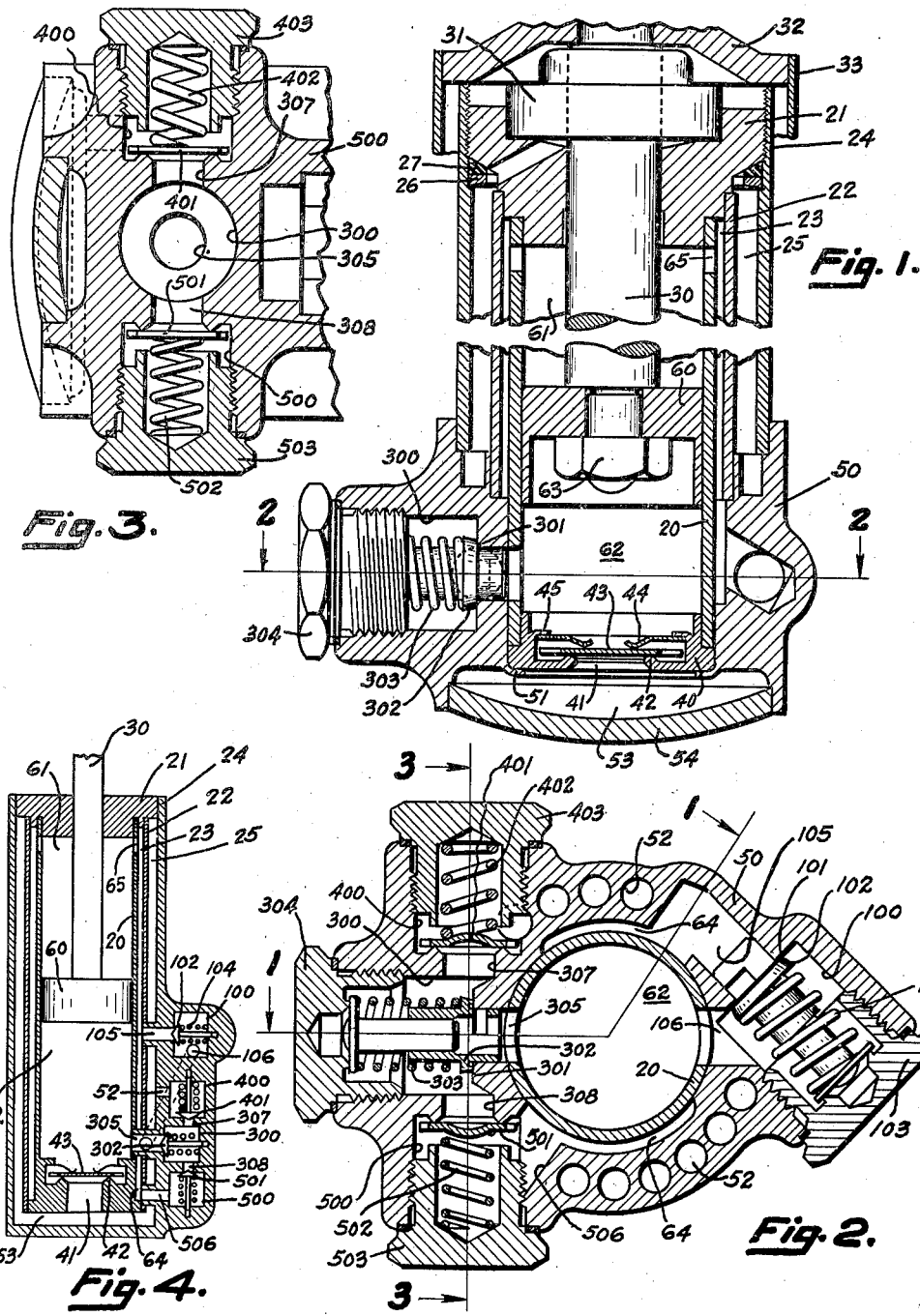
INVENTOR
EDWIN F. ROSSMAN
HIS ATTORNEYS Patented July 20, 1948

2,445,407

UNITED STATES PATENT OFFICE 2,445,407

SHOCK ABSORBER

Edwin F. Rossman, Dayton, Ohio, assignor to General Motors Corporation, Detroit, Mich., a corporation of Delaware Application October 1, 1946, Serial No. 700,414

5 Claims. (Cl. 188—88)

This invention relates to improvements in hydraulic shock absorbers, especially of the double, direct acting type.

It is among the objects of the present invention to provide a double, direct acting hydraulic shock absorber of simple design and sturdy structure in which such fluid control device which, if changed, will alter the control characteristics of the shock absorber, are all available from the outside of the shock absorber, thus eliminating the necessity of dismantling the shock absorber in order to make said changes.

One manner of accomplishing the above object is to use an imperforate piston and place the fluid flow control valves usually used in the shock absorber piston in another part of the shock absorber so that said valves are easily accessible from the outside of the shock absorber.

Further objects and advantages of the present invention will be apparent from the following description, reference being had to the accompanying drawing, wherein a preferred embodiment of the present invention is clearly shown.

In the drawing:

Fig. 1 is a longitudinal sectional view of the shock absorber taken along the line and in the direction of arrows 1—1 of Fig. 2. Certain parts are shown in elevation for the sake of clearness.

Fig. 2 is a transverse sectional view taken along the line and in the direction of the arrow 2—2 of Fig. 1.

Fig. 3 is a fragmentary sectional view taken along the line and in the direction of arrow 3—3 of Fig. 2.

Fig. 4 is a diagrammatic view illustrating the flow circuits and control devices for the fluid circulated within the shock absorber.

Referring to the drawings, the numeral 20 designates the working cylinder of the shock absorber. At the one end of this cylinder there is provided a closure member 21 having at least three annular portions of different diameters. The smallest diameter portion of the closure member 21 is press-fitted into the one end of the working cylinder 20 which abuts against the shoulder provided between this smallest diameter portion and an intermediate diameter portion of the closure member 21 which is press-fitted into the tubular member 22 concentrically surrounding the cylinder 20 and forming the annular space 23 between the cylinder and said tube 22. The largest diameter portion of the closure member 21 is threaded to be received by the interiorly threaded end of the tubular member 24. This tubular member 24 forms the annular space 25, hereinafter termed the "fluid reservoir," around the tubular member 22. The space 23 will be referred to hereinafter as the "fluid conduit."

Tubular member 24 has an inner annular shoulder upon which rests the abutment ring 26 which engages a sealing ring 27 and urges it into sealing engagement with a tapered surface of the closure member 21 and the interior of the tubular member 24 when the closure member is screwed into the tubular member 24, thus sealing the shock absorber against leaks at this point.

A central opening in the closure member 21 slidably supports the piston shaft 30 which extends to the exterior of the shock absorber through a packing 31 secured in a recess in the outer end surface of the closure member 21. A disc 32 is secured to the piston rod 30 outside the shock absorber, said disc 32 having one end of the tubular member 33 secured thereto in any suitable manner preferably by welding, this tube 33 telescopically surrounding tube 24 and forming a dust and dirt shield for the shock absorber.

A valve cage 40 is press-fitted into the end of the cylinder 20 opposite the closure member 21. This valve cage has a central opening 41 surrounded by an annular ridge 42 on the side of the valve cage adjacent the interior of the cylinder, said ridge forming a seat engaged by the intake valve 43 under the influence of spring fingers 44 formed on a ring secured within the valve cage by the spun-over portion 45.

A valve block 50 fits about and is immovably secured at the end of cylinder 20 adjacent the valve cage, one portion of said block 50 being spun over as at 51 to secure the valve cage in the end of the cylinder 20. This block provides chambers for all of the fluid flow control valves on the shock absorber excepting the intake valve 43 of the cylinder. It also provides a group of passages designated by the numeral 52 which forms communications between the annular reservoir space 25 and the lower reservoir space 53 formed by the insert plate 54 press-fitted into an annular recess in the lowermost portion of the block 50. Thus it may be seen that the intake valve 43 and its controlled opening 41 in the valve cage are in communication with the reservoir portion 53 which, through the passages 52 in the block 50, is in communication with the annular reservoir space 25.

As shown in Fig. 1, a piston 60 imperforated with the exception of a central opening, divides the cylinder 20 into two working chambers, namely, the upper working chamber 61 and the lower working chamber 62. This piston 60 has a reduced diameter portion of the piston rod 30 extending therethrough and is secured to said rod by a nut 63 threaded upon said reduced diameter portion. Thus when assembled on the piston rod, the piston 60 is in effect imperforate.

A recess in the block 50 receives the one end of the tubular member 22 so as to maintain its concentricity with the cylinder 20 and a larger diameter recess in block 50 receives the one end of the tubular member 24 to hold it in proper concentricity with the tubular member 22. The space 23 between the cylinder 20 and the tubular member 22 is in communication with a space 64 formed between the cylinder 20 and an adjacent annular wall in block 50. Thus spaces 23 and 64 in communication with each other are referred to hereinafter jointly as the fluid conduit. Four annular recesses are formed in the block 50. The first annular recess in block 50 is designated by the numeral 100, this recess providing a shoulder 101 which forms a valve seat normally engaged by the spring loaded valve 102. A threaded plug 103 is threadedly received by the recess 100. This threaded plug acts as an abutment for one end of a spring 104 while the other end of the spring engages the valve 102 and urges it into engagement with the valve seat 101. A duct 105, opening into the valve chamber 100 communicates with the fluid conduit portion 64. Valve 102 normally closes communication between the conduit 23—64, duct 105 and the valve chamber 100 and inasmuch as conduit 23 is in communication with the upper, rod containing working chamber 61 through openings 65 in the cylinder, said valve 102 may be said normally to shut off communication between the working chamber 61 and the portion of the shock absorber in communication with valve chamber 100. In Figs. 2 and 4 it may clearly be seen that a passage 106, formed by aligned openings in the block 50 and the cylinder 20, provides communication between the valve chamber 100 and the lower working chamber 62 of shock absorber. Consequently valve 102 is now recognized as a fluid flow controlling device normally shutting off communication between chambers 61 and 62, but adapted to respond to a predetermined fluid pressure within the chamber 61 as the piston 60 moves to discharge fluid therefrom for establishing a fluid flow from said rod containing chamber 61, through the openings 65, fluid conduit 23—64, passage 105, past valve 102 thence through the valve chamber 100 and duct 106 into the lower working chamber 62. Due to the presence of the piston rod 30 in the discharging chamber 61, an insufficient amount of fluid will be forced from chamber 61 to satisfy the capacity of the lower chamber 62 resulting in a pressure differential between chambers 62 and 53, thereby causing valve 43 to be lifted from its valve seat 42 against the effect of the spring fingers 44 to establish a substantially unrestricted flow of fluid from the reservoir 53, opening 41, to valve chamber 53 into the lower working chamber 62 of this cylinder.

In the claims the intake valve 43 has been referred to as the "second valve" of the shock absorber and thus the valve of the shock absorber, contained within the recess 300 in the block 50, will be considered the third valve. This recess 300 presents a valve seat 301 against which valve 302 is yieldably urged by spring 303 interposed between said valve and a plug 304 threadedly received into the outer end of the recess or valve chamber 300. This valve chamber 300 is in communication with the lower working chamber 62 through a duct 305 formed by aligned openings in the cylinder 20 and block 50. Valve chamber 300 has two outlet ports, the one designated by the numeral 307 leading into the recess or valve chamber 400 in the block 50, the other designated by the numeral 308 leading into the recess or valve chamber 500. Thus, the one outlet port 307 of the valve chamber 300 becomes the inlet port for valve chamber 400 and the other outlet port 308 of valve chamber 300 becomes the inlet port for the valve chamber 500. Inlet port 307 is surrounded by an annular ridge presenting a valve seat against which a disc valve 401 is yieldably urged by a spring 402 interposed between said valve and the screw plug 403 threadedly received in the outer end of the valve chamber 400. Inlet port 308 of the valve chamber 500 is also surrounded with an annular ridge providing a valve seat yieldably engaged by the disc valve 501 under the effect of a spring 502 interposed between said valve and screw plug 503 threadedly received by the outer end of valve chamber 500. The spring 502 is of comparatively lighter construction than the spring 402, thus a lighter or lesser fluid pressure is required to move valve 501 from its seat than that required to move valve 401 from its seat. Valve chamber 400 is in communication with the reservoir 25 through one of the reservoir passages 52 in the block 50. The valve chamber 500 is in communication with the fluid conduit 23—64 by outlet duct 506 in block 50.

When installed on an automobile, the present shock absorber is intended to control approaching and separating movements of the frame and axle of the vehicle. The shock absorber body, that is the portion to which block 50 is secured, may be anchored to the axle of the vehicle while the shock absorber piston rod 30 may be secured to the frame of the vehicle. Thus when the frame and axle of the vehicle move to approach each other, the shock absorber piston is urged downwardly in its cylinder as regards Fig. 1, towards the intake valve 43. Due to this downward movement of the piston 60, pressure will be exerted upon the fluid within the lower working chamber 62 thereby assisting spring fingers 44 to urge the valve 43 upon its seat 42. As soon as the pressure in chamber 62 reaches a predetermined value, the fluid in passage 305, acting against the valve 302 will move said valve against the effect of its spring 303 to disengage seat 301 and thereby establish a restricted flow of fluid into the valve chamber 300. It has been stated heretofore that valve chamber 300 has two outlet ports, namely, 307 and 308, the former leading into the valve chamber 400, the latter into the valve chamber 500. Thus, outlet port 307 of valve chamber 300, now becomes the inlet port for valve chamber 400 controlled by the spring loaded valve 401, and outlet port 308 of valve chamber 300 becomes the inlet port for valve chamber 500 controlled by the spring loaded valve 501. It has also been stated that valve 501 is loaded with a lighter spring 502 than valve 401 which is loaded by a heavier spring 402 and consequently at a predetermined low pressure within the valve chamber 300 due to the flow of fluid from the low working chamber past valve 302, valve 501 will be first moved from its seat to establish a flow from chamber 300 through the port 308 past valve 501 into the chamber 500 thence through the outlet port 506 into the fluid conduit 64—23, opening 65 in the cylinder into the upper or rod containing working chamber 61 of the cylinder. Due to the presence of the piston rod 30 in the upper working chamber 61 all fluid discharged from the lower working chamber 62 cannot be received by said upper chamber and consequently fluid displaced by the piston rod 30 will result in an increase in pressure within the valve chamber 300 which, when reaching a predetermined value, will act through port 307 against valve 401 to lift it and thereby establish a second flow from the valve chamber 300 through the port 307 past valve 401 into the valve chamber 400 thence through one of the passages 52 in communication with said valve chamber to the reservoir 25. The restriction to the flow of fluid offered by valve 302, causes the shock absorber to provide resistance to the approaching movement between the two relatively moving members between which it is connected and thus this movement will be controlled.

When said relatively movable members separate due to the rebound action of the suspension springs between the vehicle frame and axle, a reverse movement of the piston obtains, that is, the piston will be moved upwardly in the cylinder as regards Fig. 1 away from the intake valve 43. Now pressure is exerted upon the fluid within the upper working chamber 61 forcing said fluid from this chamber through openings 65, fluid conduit 23—64, past valve 102 into valve chamber 100 and then through its discharge passage 106 into the lower working chamber 62. As has been stated, insufficient fluid is discharged from the upper working chamber 61 completely to fill the lower working chamber 62 and consequently a replenishing or intake valve 43 will be moved from its seat to establish a fluid replenishing flow into the lower working chamber 62 from the reservoir portion 53.

From the aforegoing it will be seen that applicant has provided a double, direct acting hydraulic shock absorber of simple design and sturdy structure in which fluid control devices providing restriction to fluid flow are so constructed and arranged that each one is available from the exterior of the shock absorber so that in case it is desired to change valves in order to alter the control characteristics of the shock absorber it will be unnecessary to dismantle the entire shock absorber. No control valves are included in the piston as in the usual case and thus it is unnecessary to get to the piston by tearing down the whole shock absorber in order to make alterations. Due to the fact that all valves, excepting the replenishing valve 43, are accessible from the exterior of the shock absorber, alterations in valves to vary shock absorber control characteristics may be made without disassembling the device as has been previously necessary.

While the embodiment of the present invention as herein disclosed, constitutes a preferred form, it is to be understood that other forms might be adopted, all coming within the scope of the claims which follow.

What is claimed is as follows:

1. An hydraulic shock absorber having a cylinder provided with an end through which a rod slidably extends, said rod having a piston attached thereto which divides the cylinder into two working chambers; a fluid containing reservoir; and a plurality of valves for controlling fluid flow as the piston is reciprocated in one direction or the other, certain of said valves being operative by fluid pressure, as the piston moves to force fluid from the rod containing working chamber, to establish separate fluid flow from said rod containing chamber and from the reservoir into the other working chamber; another of said valves being operative by fluid pressure in said other chamber as the piston moves to discharge fluid therefrom, to establish a fluid flow which is directed against two valves, one of which is operative at a predetermined pressure to establish a flow into the rod containing chamber, the second being operative at a comparatively higher fluid pressure to establish a flow into the fluid reservoir.

2. In an hydraulic shock absorber, the combination with a fluid containing reservoir in communication with a cylinder divided into two working chambers by a solid piston actuated by a rod extending through one working chamber; an expansion chamber having two valved outlet ports, a plurality of spring loaded valves for controlling fluid flow, two of said valves being operated as the piston moves to displace fluid from the rod containing working chamber, one to establish a flow from said rod containing chamber into the other working chamber, the second valve to establish a flow from the reservoir into said other working chamber, a third valve being operative as the piston moves in the opposite direction to discharge fluid from said other working chamber, to establish a flow into the expansion chamber having the said two valved outlet ports, and the fourth and fifth valves controlling fluid flow through the outlet ports of said expansion chamber, the fourth valve at a certain fluid pressure, establishing a flow into the rod containing chamber, the fifth valve, at a comparatively higher fluid pressure, establishing a flow from said expansion chamber into the reservoir.

3. In an hydraulic shock absorber, the combination with a fluid containing reservoir in communication with a cylinder divided into two working chambers by a solid piston actuated by a rod extending through one working chamber; of a plurality of valve chambers, each provided with inlet and outlet ports, the inlet port of each valve chamber being normally closed by a spring loaded valve, the inlet port and outlet ports of the first valve chamber communicating respectively with the rod containing and the second working chambers, the inlet and outlet ports of the second valve chamber communicating respectively with the reservoir and second working chamber, the inlet port of the third chamber communicating with the second working chamber, said third chamber having two outlet ports which form the inlet ports of the fourth and fifth valve chambers the outlet ports of the fourth and fifth valve chambers communicating respectively with the rod containing working chamber and the reservoir and the valve in the fourth chamber being operative to open at a lower fluid pressure than the valve in the fifth chamber.

4. An hydraulic shock absorber comprising in combination, a working cylinder having a closure member at its one end and a valve cage at its other end; a block surrounding the cylinder adjacent the valve cage; two tubular members concentrically supported between the closure member and block, one tubular member forming a fluid conduit around the cylinder, said passage being in constant communication with the rod containing working chamber, the other forming a fluid reservoir; an imperforate piston in the cylinder dividing it into two working chambers, said piston being attached to a rod extending through one working chamber and the closure member; a check valve in the valve cage, operative when the piston moves to force fluid from the rod containing chamber, to open communication between the other working chamber and the reservoir; valve chambers in the block, each provided with fluid inlet and outlet ports, each chamber having a closure plug accessible from outside the shock absorber; a valve in each valve chamber yieldably closing the inlet port thereof, the inlet and outlet ports of one valve chamber communicating respectively with the fluid conduit and the other working chamber, another of said valve chambers having its inlet port communicating with said other working chamber and having also two outlet ports which form the inlet ports of two other valve chambers, one of which opens to the fluid conduit, the second to the reservoir, the valve closing the port leading to the fluid conduit requiring less pressure to open it than the valve closing the port leading to the reservoir.

5. An hydraulic shock absorber comprising in combination, a working cylinder having a closure member at its one end and a valve cage at its other end; a block surrounding the cylinder adjacent the valve cage; two tubular members concentrically supported between the closure member and block, one tubular member forming a fluid conduit around the cylinder, said conduit being in constant communication with the rod containing working chamber, the other tubular member forming a fluid reservoir; an imperforate piston in the cylinder dividing it into two working chambers, said piston being attached to a rod extending through one working chamber and the closure member; a check valve in the valve cage, operative when the piston moves to force fluid from the rod containing chamber, to open communication between the other working chamber and the reservoir; valve chambers in the block, each provided with fluid inlet and outlet ports, each chamber having a closure plug accessible from outside the shock absorber; a valve in each valve chamber yieldably closing the inlet port thereof, the inlet and outlet ports of one valve chamber communicating respectively with the fluid conduit and the other working chamber, another of said valve chambers having its inlet port communicating with said other working chamber and having also two outlet ports, each one of which opens into a separate valve chamber and forms the inlet port for said chamber, the outlet port of the one leading to the fluid conduit and the outlet port of the other leading to the reservoir, the valve closing the inlet port of the chamber communicating with the fluid conduit responding first to fluid pressure to establish a flow through the conduit into the rod containing working chamber, the valve closing the outlet port leading to the reservoir being operative to establish its flow in response to higher fluid pressure caused by fluid displaced by the piston rod.

EDWIN F. ROSSMAN.

REFERENCES CITED

The following references are of record in the file of this patent:

UNITED STATES PATENTS

| Number | Name | Date |
|---|---|---|
| 2,025,199 | Funston | Dec. 24, 1935 |